Figure 3:
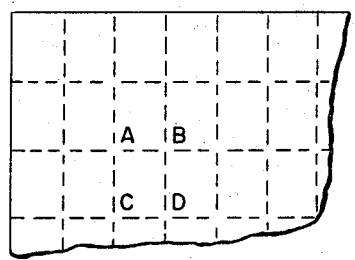

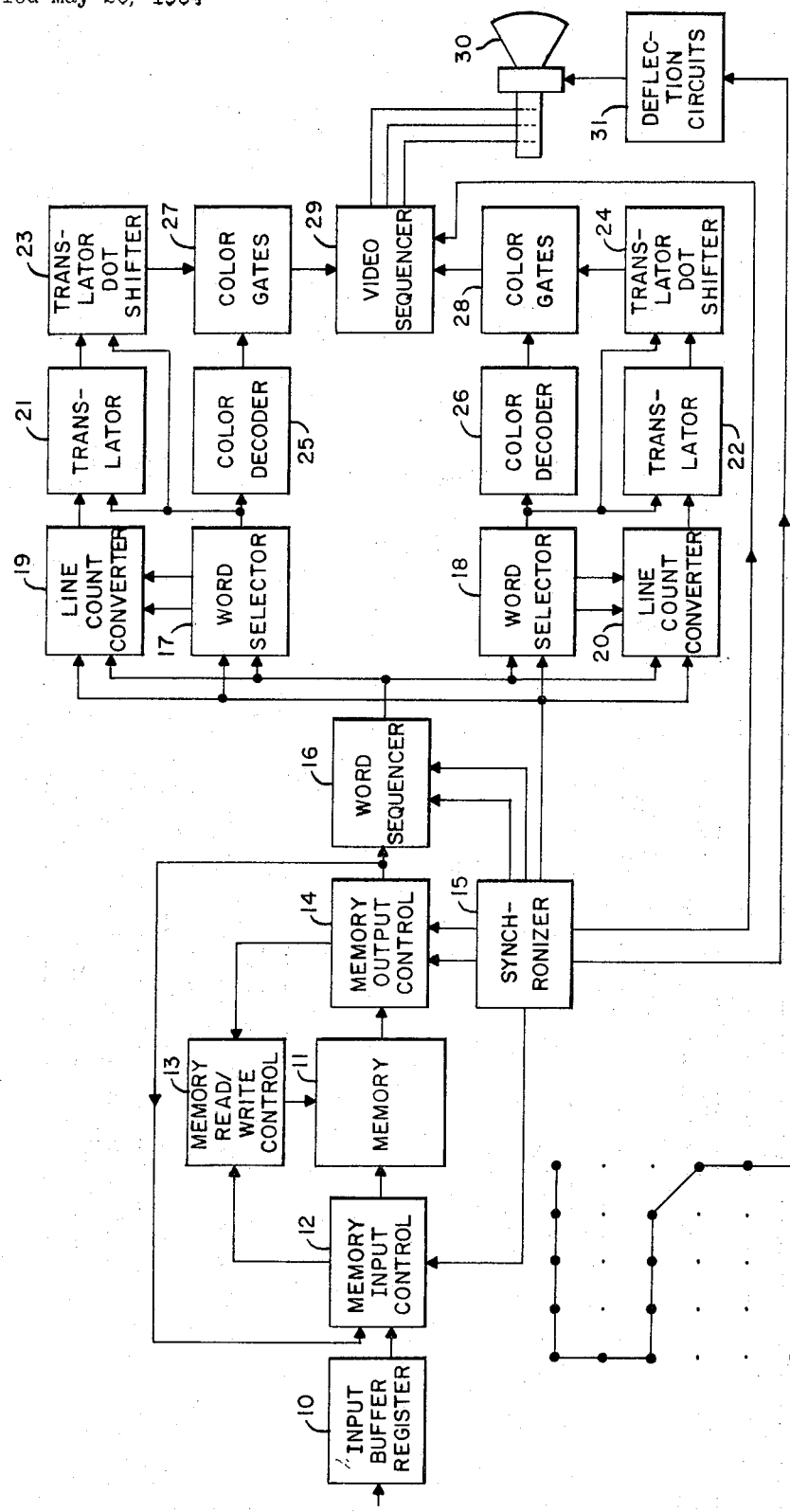

Nov. 7, 1967   W. R. WAGNER   3,351,929
DATA CONVERTER
Filed May 26, 1964   3 Sheets-Sheet 2

United States Patent Office 3,351,929
Patented Nov. 7, 1967

3,351,929
DATA CONVERTER
William R. Wagner, Bronx, N.Y., assignor to Hazeltine Research Inc., a corporation of Illinois
Filed May 26, 1964, Ser. No. 370,154
13 Claims. (Cl. 340—324)

This invention relates to a data converter system for use in line scan display or recording systems where it is required to record or display a plurality of numbers, letters or other characters presented to the data converter in coded form.

In recent years sophisticated display systems have come into frequent use. For many applications the radar displays with their discontinuous presentation of data are yielding to line scan display systems, such as television, which have a continuous bright presentation of data. These line scan display systems have many advantages beside the obvious advantage of continuous data presentation being visually more palatable to the observer. For instance, the observer is able to more accurately determine the directional motion of the object or objects being observed. Also, by proper selection of the persistence of the display, the observer can actually determine the rate of change of the objects being observed.

Coincident with the adoption of line scan display systems for certain applications there has been a desire to display more information about the objects being observed. On two dimensional displays there is a severe limitation on the information that can be presented by the object indication itself. One way to overcome this limitation is to present the additional information by use of alpha-numeric characters adjacent to the object indications on the display. For instance, in an air traffic control problem the range and bearing of the aircraft could be given by the positions of the aircraft indications on the display and the altitude, flight number, destination, and any other pertinent information could be presented adjacent to the aircraft indications on the display in alpha-numeric form. Of course, this alpha-numeric information must move as the aircraft indication moves. The decision of what information is to be displayed and where it is to be displayed is the function of a computer. The function of the data converter is to take this coded information of the alpha-numeric characters and other symbols to be displayed and their location on the display, and convert it to a form in which it can be used in a line scan type display. Of course, a data converter of this type could be used for purposes other than auxiliary equipment to a bright display. It merely requires a source of coded information of the characters to be displayed and their position on the display.

If each line of the raster of a line scan display is considered to be composed of a plurality of discrete dot elements, then the whole raster can be considered to be composed of a plurality of dot elements and characters can be formed on the line scan display by illuminating the proper dots in a given group of dots. This group of dots within which the character is formed is called a dot matrix. The data converter will therefore accept the coded information signals representative of the characters to be displayed and convert them to their dot matrix equivalent. The present invention provides a method for converting the coded information to a dot matrix format for use in a line scan type display which does not require a storage position for each dot element of the display.

It is an object of the present invention, therefore, to provide a new and improved system for converting coded information signals representative of alpha-numeric characters to a form usable in a line scan type display wherein the characters can be located at any discrete point on the display.

It is a further object of the present invention to provide such a system that does not require a storage position for each dot element of the display.

It is still a further object of the present invention to provide a new and improved system for converting coded information signals representative of alpha-numeric characters to a form usable in a line scan type color display system wherein the characters can be located at any discrete point on the display.

In accordance with the present invention, a data converter system in which coded information signals representative of discrete characters are converted to a form suitable for reproduction in a line scan type display at positions determined by their corresponding coded addresses, comprises storage means, having a plurality of storage positions, for storing the coded information signals at different ones of said storage positions and means responsive to the coded addresses for causing the coded information signals to be stored in the storage means at positions determined by their corresponding coded addresses. The system also includes readout means for reading from the storage means the coded information signals in a line scan format, and means responsive to the readout means for converting the stored coded information signals into a second signal in which each of the characters has the form of a plurality of information bits corresponding to unique dot elements in a dot matrix; whereby substantial savings in required storage capacity results from storing the coded information signals rather than the information bits corresponding to the dot elements.

For a better understanding of the present invention together with other and further objects thereof, reference is had to the following description taken in connection with the accompanying drawings, and its scope will be pointed out in the appended claims.

Figure 4:
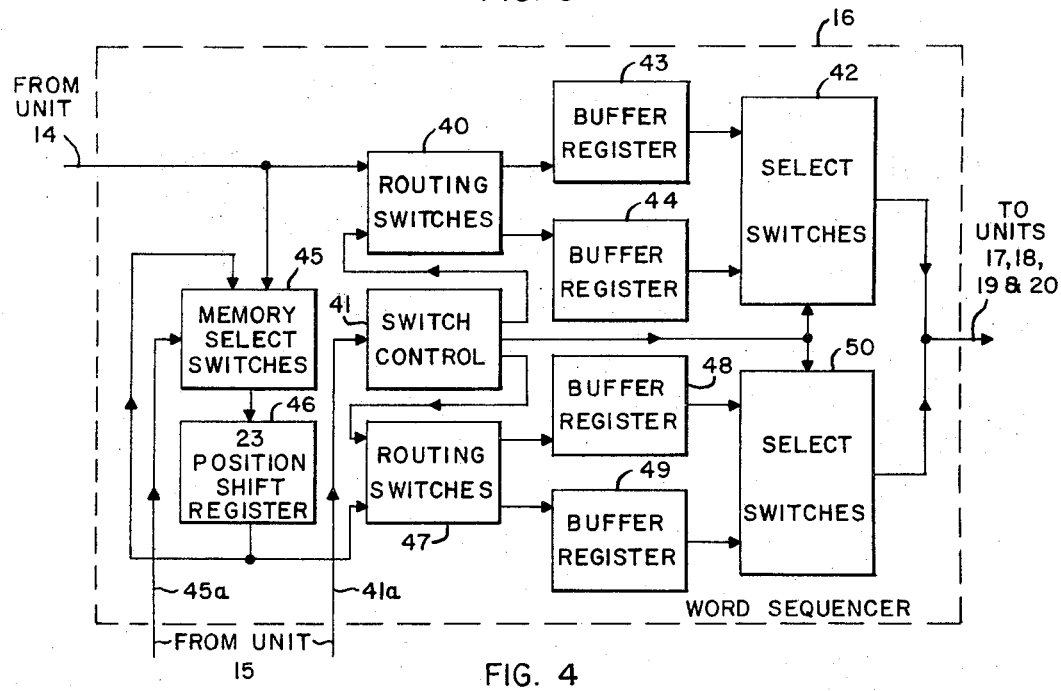
Figure 5:
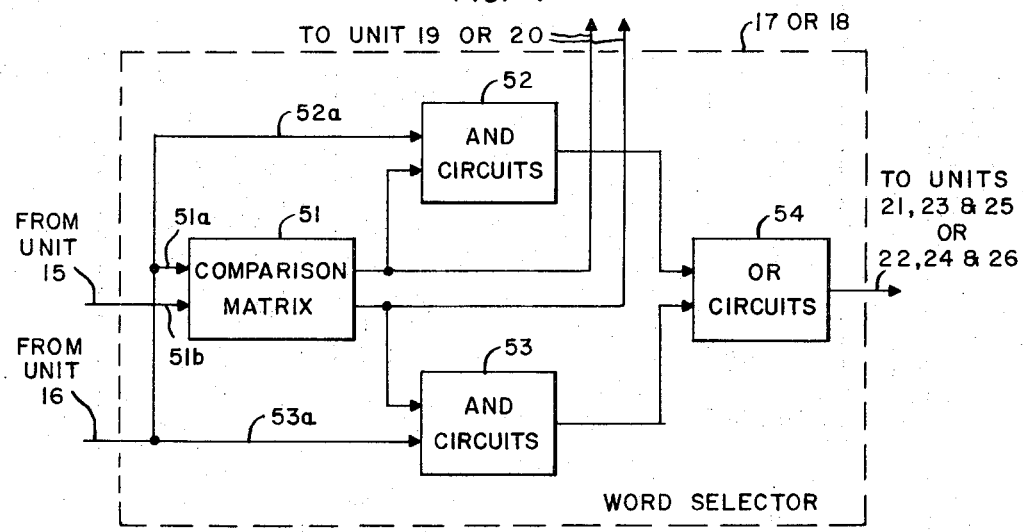
Figure 6:
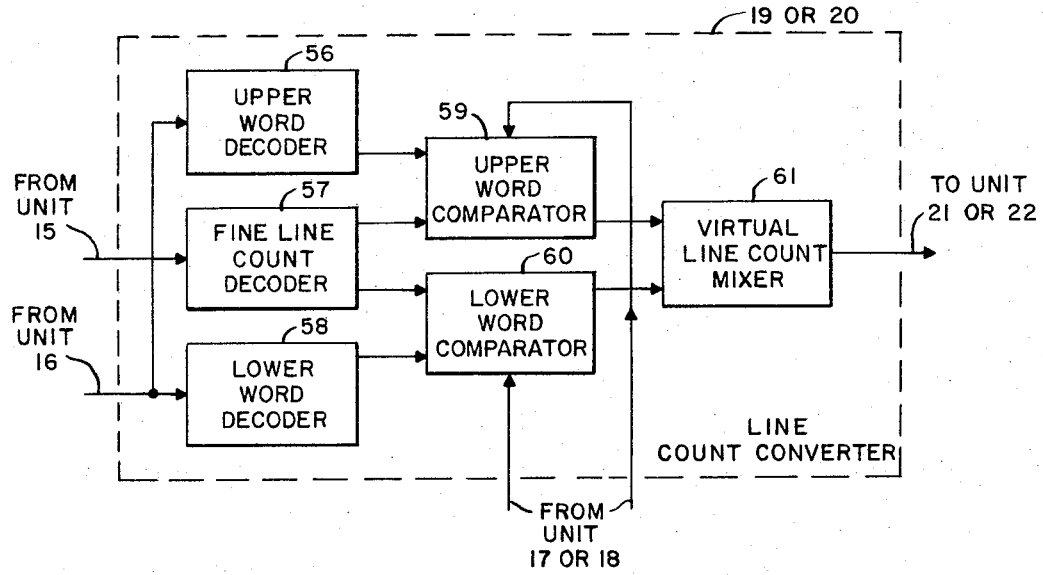
Figure 7:
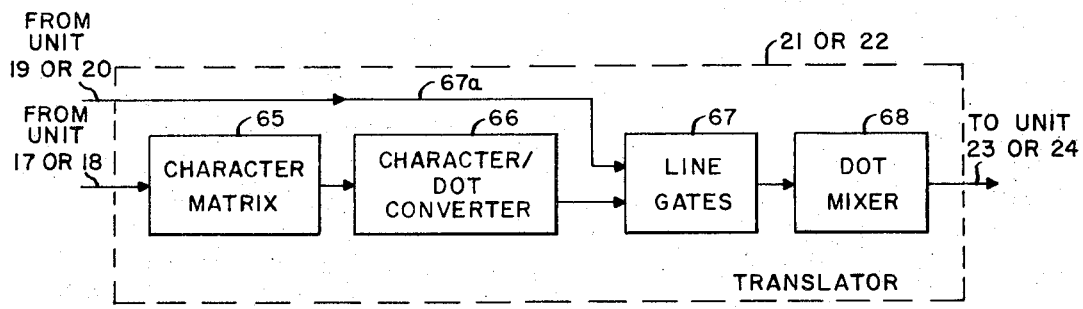
Figure 8:
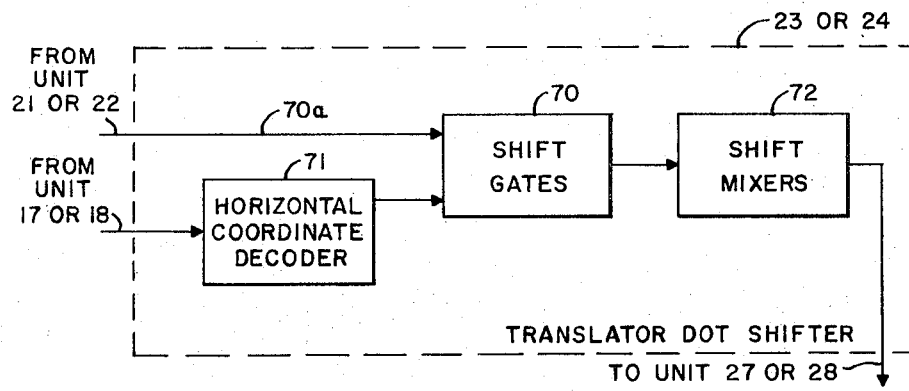

Referring to the drawings:
FIG. 1 is an example of a character formed in a dot matrix;
FIG. 2 is a block diagram of a data converter system constructed in accordance with the present invention;
FIG. 3 is a representation of a portion of a display showing how the display can be considered to be composed of a plurality of character sized segments;
FIG. 4 shows one embodiment of a word sequencer usable in the data converter system of FIG. 2;
FIG. 5 shows one embodiment of a word selector usable in the data converter of FIG. 2;
FIG. 6 shows one embodiment of a line count converter usable in the data converter of FIG. 2;
FIG. 7 shows one embodiment of a translator usable in the data converter of FIG. 2, and
FIG. 8 shows one embodiment of a translator dot shifter usable in the data converter of FIG. 2.

FIG. 1 is a representation of the manner in which the character "5" is formed in a 5 x 7 dot matrix format. It can be shown that any standard character can be formed in a dot matrix format of this size. If this character was being formed on a line scan display each dot would correspond to a dot element of the display and each horizontal group of dots would correspond to a portion of a scan line, so that each character would consist of a plurality of dot elements up to a maximum of five on a line, for seven successive lines. It is obvious that the number of elements in the matrix can vary. The more numerous these elements, the better the resolution but the fewer the characters that can be displayed on a given size display surface having a given number of dot elements.

The display surface itself can be considered to be composed of a plurality of character size segments, that is, segments the size of a dot matrix format in which the characters are to be formed. A character could therefore be located at any point on the display by positioning it in one of these character sized segments according to a coarse address and then positioning it within the segment according to a fine address.

FIG. 2 DATA CONVERTER SYSTEM

There is shown in FIG. 2 a block diagram representation of one example of a basic data converter system constructed in accordance with the present invention in which binary coded information signals representative of discrete characters and their corresponding colors are converted to a form suitable for reproduction in a line scan type color display of the type having three separate control elements, at positions determined by their corresponding binary coded addresses. In this embodiment the display system is a 945 line interlaced system having 896 useful lines per frame. For simplicity, it is assumed that the same information is displayed in each field, meaning a 5 x 7 dot matrix would actually appear as a 5 x 14 dot matrix on the display, and each dot of the character would therefore appear to be twice as long as it would in a 5 x 7 matrix. To simplify this discussion the display cycle will be considered to consist of one field and the character therefore formed in a 5 x 7 dot matrix. Each lead shown in FIG. 2 may represent a single lead or a plurality of leads.

The system includes means for accepting the binary coded information and addressing signals such as input buffer register 10. This input signal could come from any source of binary information but in a practical system would probably come from a computer distributor. Each information signal contains the character information, its color, a coarse address which defines in which display segment the character is to be initiated and a fine address which defines where in that segment that is to be initiated.

The data converter system further comprises storage means such as memory 11 containing a storage position corresponding to each of the display segments. The system also includes means responsive to said binary coded addresses for causing said binary coded information signals and their corresponding binary coded fine addresses to be stored in the storage means at positions determined by their corresponding coarse addresses. In this embodiment such means include the memory input control 12 and the memory read/write control 13 in conjunction with the memory 11. The components associated with the memory 11, memory input control 12, the memory read/write control 13 and the memory output control 14, are intended for use with a core memory and will subsequently be explained as such. However, any suitable device capable of storing digital information coud be used, be it of a random or sequential access type. The inhibit control which is coupled from the memory input control 12 to the memory 11 contains the character and color information and its corresponding fine address. The coarse address information is coupled from the memory input control 12 to the memory read/write control 13 so that the memory read/write control 13 will cause the information signals and their corresponding fine addresses to be stored in the memory position corresponding to the display segment indicated by the coarse address.

The system also includes readout means such as the memory output control 14 in conjunction with the memory read/write control 13 and the synchronizer 15 for reading from the memory 11 the binary coded information signals and their corresponding fine addresses in synchronism with the line scan display 30. The information is read from the memory 11 in a manner so that as each line of the display scans through the display character sized segments the character and fine address information for the segment in which the line scan is presently located, the segment above, the segment to the left and the segment above and to the left is presented for processing. The need for reading out the information in this manner is shown in FIG. 3. Assume that the electron beam of the display is scanning through the segment D of FIG. 3. As previously stated, each of the seven lines of that segment has five dots which may be illuminated. Since the characters determined by the character information corresponding to the segments A, B and C, can be located anywhere in their respective segments, as determined by their corresponding fine addresses, the characters to be displayed in segments A, B, and C may overlap into segment D. Therefore, to determine whether a dot in segment D is to be intensified, the information in segments A, B, C, and D must be examined and the proper information selected. The word sequencer 16 provides the means for presenting for processing the character and fine address information for the segment in which the line scan is presently located, the segment above, the segment to the left and the segment above and to the left as each line scans through the display segments.

The data converter also includes means for counting the scan lines so as to determine the vertical position of any scanning line within a segment, such as synchronizer 15. The synchronizer 15 provides the synchronization for the entire data converter, including the display 30. The heart of the synchronizer 15 is an oscillator or digital clock having an output signal with one pulse for each possible dot of the display. With the proper counting and gating circuits all the required signals can be generated at the proper time merely by counting the dot outputs. To determine the vertical position of a scanning line within the segment the synchronizer 15 could count the horizontal sync pulses generated in a seven position counter and synchronize this count with the start of a segment so that a scanning line could always be identified with respect to the segment within which it is located. This position of the scanning line is known as the fine line count.

FIG. 2 shows two parallel paths, each consisting of a fine line count converter, a word selector, a translator, a translator dot shifter, a color decoder, and color gates, by which the information from the word sequencer is processed. The information from the word sequencer 16 is divided vertically and each path processes the information corresponding to a vertical pair of segments, each pair containing an upper word and a lower word. For each scan line within each path one word will be eliminated, as will subsequently be explained, thereby eliminating the possibility of vertical overlap of the characters displayed. The following description will discuss the parallel paths in the alternative. The operation of both paths is exactly the same, the only difference being in the information processed.

The data converter further includes means for selecting the character information to be displayed from the information presented for processing for each segment as determined by the scan line count and the vertical coordinate of the fine address, such as word selectors 17 and 18. The word selector, 17 or 18, compares the fine line count with the vertical coordinate of the fine address of the upper word. If the vertical coordinate of the fine address of the upper word is equal to or less than the fine line count it indicates the upper word has been completed; therefore the word selector, 17 or 18, selects the character and color information for the lower word along with its fine address and discards the information for the upper word. If the vertical coordinate of the fine address of the upper word is greater than the fine line count then the information for the upper word is selected and the information for the lower word is discarded.

The data converter further includes means for correlating the vertical coordinate of the fine address corresponding to the character selected to be displayed by the word selector 17 or 18 with the fine line count so that the proper dot information for each line of the character is produced for each scan line, such as line count converters 19 and 20. The need for this correlation can best be explained by this example. Assume the fine line count were two and the vertical coordinate of the fine address of the upper word were four. The translator 21 or 22 should produce the dot information equivalent to the sixth line of the character for that scan line, the line to be produced being neither the fine line count nor the vertical coordinate of the fine address. This output of the line count converters shall be known as the virtual line count.

The data converter system also includes means for converting that part of said selected information signals representative of the characters into a second signal in which each of the characters is represented by a plurality of information bits corresponding to unique dot elements in said line scan display, such as translators 21 and 22. The translator 21 or 22 accepts the binary coded information signals representative of the characters to be displayed from the word selector 17 or 18 and converts it to the dot matrix equivalent of the character. This dot matrix equivalent of the character must be coupled out of the translator in synchronism with the display so that each line of the dot matrix is coupled to the display at the proper time. This is accomplished by coupling the virtual line count from the line count converter to the translator.

The data converter further comprises means responsive to the fine address of the character for positioning the information bits representative of the character with respect to the segment in which they are to be displayed as the function of the corresponding fine address, such as translator dot shifters 23 and 24. If the dot matrix equivalent of the character were coupled directly from the translator to the display, the character would appear centered in the segment indicated by the coarse address as far as the horizontal coordinate is concerned. The proper vertical position of the character has already been insured by the line by line examination of the binary information by the line count converters and the word selectors. The dot matrix equivalent of the character is positioned horizontally by the translator dot shifter 23 or 24 according to the horizontal coordinate of the fine address. The dot matrix is shifted line by line the number of times indicated by the fine address.

The data converter also includes means for converting that part of the selected information signals representative of the colors of the characters into a plurality of signals individually representative of three component colors corresponding to the three control elements of the display device 30, such as color decoders 25 and 26. The color decoders consist of a simple diode matrix which develops an output for each of the component colors as indicated by the binary color coded information coupled from the word selector 17 or 18 to the color decoder 25 or 26.

The data converter also includes conditioning means so responsive to said individual color representative signals and said second signal representative of the characters, that an individual second signal representative of the characters is produced for each color representative signal such as color gates 27 and 28. The information bits which are processed line by line are loaded from the translator dot shifter 23 or 24 into the corresponding positions of each of three groups of two input AND gates, each group corresponding to each of the three colors. The second inputs to these AND gates are the three color component representative signals of the color decoder 25 or 26, one input to each group of these gates. Therefore, there will be an output signal representative of the character for each color component representative signal.

The system also includes means for coupling each individual second signal representative of the character to the corresponding control elements of the display device such as video sequencer 29 and synchronizer 15. The video sequencer 29 and synchronizer 15 operating in conjunction with the rest of the data converter so couple the information to the display 30 that the characters are produced on the display 30, once each frame, as a plurality of dot elements at the segment indicated by the coarse address and within the segment as determined by the fine address and in the colors indicated by the binary coded information signals.

The video sequencer 29 consists of two groups of two input AND gates, one group corresponding to each of the color gates 27 and 28 with an AND gate in each group corresponding to each AND gate of the color gates 27 and 28. The dot information is positioned in these AND gates in the same order in which it existed in the translator dot shifter 23 or 24. The second input to these AND gates is the output of a timing chain derived from the clock of the synchronizer 15 which has one output for each of the ten dots of the display presented simultaneously by the color gates 27 and 28. The outputs from the synchronizer 15 are coupled in sequence to separate AND gates of the video sequencer 29. Since the outputs of the color gates represent the information in a horizontal pair of segments, each segment being five dots wide, the first five outputs of the synchronizer 15 are coupled to the first five AND gates of the first group of AND gates in the video sequencer 29. Subsequent outputs are coupled to the second group of AND gates and also the remaining AND gates in the first group. The outputs of the two groups of AND gates are combined in OR circuits according to common dot positions on the display 30. The outputs of these OR circuits are coupled to the three separate grids of the display 30 so that the characters are formed on the display as a plurality of dot elements as the beam is scanned in a line scan pattern by the deflection circuits 31 under the control of the synchronizer 15.

DETAILED CIRCUITS OF FIGS. 4, 5, 6, 7 AND 8

FIG. 4 is a more detailed presentation of the word sequencer 16. The binary coded information signals have been located in the memory 11 according to their corresponding display segments in sequential order, reading the segments from left to right and top to bottom. These information signals are read from the memory 11 and coupled to the word sequencer 16 in the same order and in four word groups, that is to say, the information for four adjacent segments is read out at a time. The information is read out in this manner merely to reduce the memory speed and any number of words could be read out at a time. Each word consists of fifteen bits, six bits for the character, three bits for the horizontal coordinate of the fine address, three bits for the vertical coordinate of the fine address, and three bits for the color. These four words are coupled to the routing switches 40 which consist of one hundred twenty (120) two input AND circuits, two AND circuits for each bit. These AND circuits are divided into two groups, four words (sixty AND circuits) to a group, one group corresponding to each of the buffer registers 43 and 44. The first of four words read from the memory 11, which correspond to the first four signals in the first line of display segments are coupled to both groups of gates in the routing switches 40, as is each succeeding four word group read from the memory 11. The switch control 41, according to timing signals supplied from synchronizer 15, by lead 41a, gates each of the four word groups read from the memory 11 alternately to buffer registers 43 and 44 by way of routing switches 40. The information in the buffer registers 43 and 44, which is coupled to the select switches 42, is stored in these registers under the control of the synchronizer 15, so that, except for the period when only the first four words of a row have been read from the memory 11, there are always eight words presented to the select switches 42. The select switches consist of one hundred twenty (120) two input AND circuits, one corresponding to each stage of the buffer registers 43 and 44. These AND circuits are followed by thirty (30) four input OR circuits. The purpose of the OR circuits is to provide an output means capable of handling two words at a time, there being fifteen bits per word. The AND circuits that correspond to the common position bits from the first, third, fifth and seventh words are coupled to separate OR circuits so that the AND circuits that correspond to the four first position bits are coupled to the first OR circuit, the AND circuits that correspond to the four second position bits are coupled to the second OR circuit and all the common position bits are connected in a like manner.

In a similar manner the common order bits from the second, fourth, sixth and eighth words are coupled to the second fifteen OR circuits. Then, under the control of the synchronizer 15 the second inputs are sequentially coupled to these AND circuits from the switch control 41, one word at a time. In this manner, two adjacents words, the word in which the beam is scanning and the word immediately to the left, are presented for processing from select switches 42.

When each four word output from the memory 14 is coupled to the routing switches 40 it is also coupled to the memory select switches 45 together with the output from the twenty-three position shift register 46. The memory select switches 45 will choose the output of the twenty-three position shift register unless the display is sweeping the last line from any row of segments as determined by the input 45a from the synchronizer 15, when it will choose the input from the memory 11. The output from the memory select switches 45 is coupled to the twenty-three position shift register 46 where it is advanced one position each time a four word group is entered from the memory 11, until it is coupled out at the twenty-third position to the routing switches 47 and the memory select switches 45. Each four word group at the twenty-third position of shift register 46 is coupled to buffer registers 48 and 49 via routing switches 47 in the same manner as each four word group is coupled to buffer registers 43 and 44 via routing switches 40. The data stored in the buffer registers 48 and 49 are coupled to the outputs of select switches 50 and in the same manner as select switches 42 so that two words read out from select switches 50 correspond to the display segments immediately above the display segments that correspond to the two words that are simultaneously being read out of select switches 42.

FIG. 5 is a more detailed description of the word selectors 17 and 18. The binary coded information representative of the character and the horizontal coordinate of the fine address for the upper word is coupled from the word sequencer 16 to AND circuits 52 by leads 52a. The binary coded information representative of the character and the horizontal coordinate of the fine address for the lower word is coupled to AND circuits 53 from the word sequencer 16 by leads 53a. The vertical coordinate of the upper word is coupled from the word sequencer 16 by lead 51a and the fine line count from the synchronizer 15 is coupled to the comparison matrix by lead 51b. The comparison matrix 51 determines the relationship between the vertical coordinate of the upper word fine address and the fine line count. If the vertical coordinate of the upper word fine address is equal to or less than the fine line count it indicates the upper word has been completed and the information for the lower word should be used. An enabling signal is therefore coupled from the comparison matrix 51 to AND circuits 53 thereby coupling the lower word information from the word sequencer 16 to the translator 21 or 22, translator dot shifter 23 or 24 and the color decoder 25 or 26 via OR circuits 54. If the vertical coordinate of the upper word fine address is greater than the fine line count it means the upper word has not been completed and the information for the upper word must be used, an enabling signal is then coupled to AND circuits 52 from the comparison matrix 51 thereby coupling the upper word information from the word sequencer 16 to the translator 21 or 22, translator dot shifter 23 or 24 and the color decoder 25 or 26 via OR circuits 54.

FIG. 6 is a more detailed description of the line count converters 19 and 20. The upper word decoder 56 accepts the binary code of the vertical coordinate of the fine address of the upper word from the word sequencer 16 and converts it to its digital equivalent so that there are seven possible outputs of the upper word decoder, one for each possible vertical coordinate of the fine address. The fine line count decoder 57 and the lower word decoder 58 perform the same function for the fine line count and the vertical coordinate of the fine address of the lower word. The fine line count and the vertical coordinate of the fine address of the upper word are coupled to the upper word comparator 59 where they are compared and the virtual line count produced, the virtual line count being the line of the character the translator is to produce. For the above example where the vertical coordinate of the upper word fine address is four and the fine line count is two, the virtual line count is six.

The fine line count and the vertical coordinate of the fine address of the lower word are coupled to the lower word comparator 60 where they are compared and the virtual line count is produced. For example, if the vertical coordinate of the lower word fine address is two and the fine line count is seven the virtual line count would still be six, but now it would be produced from the lower word comparator 60. Enabling signals are coupled from the comparison matrix 51 of the word selector 17 or 18 to the upper word comparator 59 and lower word comparator 60. Depending on the word selected to be displayed by comparison matrix 51, either the upper word comparator 59 or lower word comparator 60 is enabled. The outputs from the upper word comparator 59 and the lower word comparator 60 are combined in the virtual line count mixer 61 and coupled to the translator 21 or 22.

FIG. 7 is a more detailed description of the translators 21 and 22. The binary coded information representative of the character is coupled from the word selector 17 or 18 to the character matrix 65 where the binary information representative of the character is decoded to activate the lead to the character-to-dot converter 66 indicated by the binary information. This character-to-dot converter 66 actually consists of thirty-five OR circuits, one corresponding to each dot of a 5 x 7 dot matrix. Each OR circuit will have as many inputs as there are characters that use the dot that corresponds to this OR circuit. The lead from the character matrix 65 is thus coupled to the OR circuits for all dots that are used to form the character indicated. Thus, if the binary information indicated that character "5" were to be formed, the lead corresponding to the character five from the character matrix 65 would be activated and it would be coupled to seventeen OR circuits in order to form the character "5" as shown in FIG. 1. The outputs of these OR circuits are coupled to corresponding two input AND gates in the line gate 67. The second input to these AND circuits is the virtual line count coupled from the line count converter 19 or 20 by leads 67a. Since the virtual line count from the line count converter 19 or 20 is a sequential output, the groups of dots corresponding to the lines of the characters are sequentially coupled to the dot mixer 68 which merely combines dot outputs according to common horizontal positions.

FIG. 8 is a more detailed description of the translator dot shifters 23 and 24. Each group of five dot levels from the dot mixer 68 of translator 21 or 22 is loaded into the shift gates 70 in five different locations by way of leads 70a. The horizontal coordinate of the fine address of the word to be displayed is coupled from the word selector 17 or 18 to the horizontal coordinate decoder 71 where it will cause one of five leads to be activated. These five leads are individually coupled to the five positions of the shift gates so that the dot levels will be coupled from one of these shift gate positions to the shift mixer 72 where the dot levels are combined according to positions in a group of nine OR circuits. For example, if the horizontal coordinate indicates the character is to begin in the second column of the segment, the second output lead of the horizontal coordinate decoder 71 is activated thereby coupling the information bits from the second position of the shift gate to positions two through six of the shift mixer. If the X coordinate indicates the character is to begin in the third column of the segment the information bits would be coupled to positions three through sevent of the shift mixer.

These dot levels are thereupon coupled to the display 30 by way of the color gates 27 or 28 and video sequencer 29 as previously explained so that the characters are produced on the display 30 as a plurality of dot elements at the segment indicated by the coarse address and within the segment as determined by the fine address and in the colors indicated by said binary coded color information signals.

SUMMARY

In summary, the data converter in the particular embodiment shown and described is a system which converts coded information signals, such as binary coded information signals, representative of characters into a form which can be used to display the characters on a line scan type display at specified locations. The locations for each character specified by a computer consists of a coarse address and a fine address. The coarse address determines within which character sized segment of the display the character is to be begun and the fine address locates the character within the segment. The combination of the coarse and fine address allows the character to be located at any point on the display.

The coded character information, its corresponding coded address, and if it is to be displayed on a color display, the coded color information, are randomly coupled from an external computer or computer distributor to the data converter. This information is then coupled to the memory in the data converter. The coded character information, its corresponding fine address and color information are stored in the memory position that corresponds to the coarse address of the character, there being one memory position for each coarse address. As the display is scanned by the electron beam the character information, fine address and color information are read from the memory in line scan format. This information is presented for processing four words at a time so that all the possible character information that could determine whether a particular dot of the display is to be illuminated is available for examination. The information is examined line by line as a function of the vertical coordinate of the fine address and the proper information chosen on the basis that the upper word is always completed before the lower word is begun. The selected character information is then converted line by line into a dot matrix format by which it can be displayed by blanking or unblanking the proper dot elements on the display. This dot information is then shifted horizontally according to the horizontal coordinate of the fine address so that the character will be displayed at the proper location.

As the character information is converted to the dot matrix equivalent the color information is decoded into its primary components, one component corresponding to each control element of the color display. The decoded color information is then used to couple the dot matrix information of the character to each control element of the display, the dot matrix information being coupled to each control element that the decoded color information indicates. The character information is thereby presented on the display at the position and in the color indicated.

Part of the present invention could also be used in conjunction with a display device that was not a line scan display device; in fact it could be used in conjunction with a display device that had no fixed scanning pattern. By retaining the memory address, as the character and fine address information are read out, the complete address for each character is made available. The coded character information can then be converted to a form suitable for use with any of the several character generation techniques and positioned on the display by the character address. In this manner the coded character and coded address information can be stored and made available for display without actually providing storage bits for the coarse address.

The circuit elements not herein described in detail are well known to those in the art and the complete data converter can therefore be constructed and used by one skilled in the art using the concepts and teaching available in the prior art.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A data converter system in which coded information signals representative of discrete characters are converted to a form suitable for reproduction in a line scan type display at positions determined by their corresponding coded addresses, said system comprising:
   storage means, having a plurality of storage positions, for storing said coded information signals at different ones of said storage positions;
   means responsive to said coded addresses for causing the coded information signals to be stored in said storage means at positions determined by their corresponding coded addresses;
   readout means for reading from said storage means said coded information signals in a line scan format;
   and means responsive to said readout means for converting said stored coded information signals into a second signal in which each of the characters has the form of a plurality of information bits corresponding to unique dot elements in a dot matrix;
   whereby substantial savings in required storage capacity results from storing the coded information signals rather than the information bits corresponding to the dot elements.

2. A data converter system in which coded information signals representative of discrete characters are converted to a form suitable for reproduction in a line scan type display at positions determined by their corresponding coded addresses, said addresses including a coarse address which defines a display character sized segment in which the production of the character is to be initiated and a fine address which defines at what point in said display segment the production of the character is to be initiated, said system comprising:
   storage means, having a plurality of storage positions, for storing said coded information signals at different ones of said storage positions;
   means responsive to said coded addresses for causing the coded information signals and their corresponding coded fine addresses to be stored in said storage means at the storage positions determined by the corresponding coarse addresses;
   readout means for reading from said storage means said coded information signals and their corresponding fine addresses in a line scan format;
   means responsive to said readout means for converting said stored coded information signals into a second signal in which each of the characters has the form of a plurality of information bits corresponding to unique dot elements in a dot matrix;
   and means responsive to the fine addresses of the characters for positioning said information bits, representative of the characters, with respect to the segments within which each character is to be displayed, as a function of their corresponding fine addresses.

3. In a data converter system wherein coded information signals representative of discrete characters are converted to a form suitable for reproduction in a line scan type display at positions determined by corresponding coded addresses, apparatus comprising:

means for accepting said coded information and addressing signals;

storage means, having a plurality of storage positions, for storing said coded information signals at different ones of said storage positions;

means responsive to said coded addresses for causing the coded information signals to be stored in said storage means at positions determined by their corresponding coded addresses;

readout means for reading from said storage means said coded information signals in synchronism with said line scan display;

means responsive to said readout means for converting said stored coded information signals into a second signal in which each of the characters has the form of a plurality of information bits corresponding to unique dot elements in a line scan display;

and means for coupling said second signal to the line scan display to control said display;

the data converter being so constructed and arranged that the characters are presented on said display at least once each frame as a plurality of dot elements at the positions indicated by said coded addresses;

whereby substantial savings in required storage capacity results from storing the coded information signals rather than the information bits corresponding to the dot elements.

4. A data converter system in accordance with claim 3 wherein the means for converting the stored coded information signals are constructed to respond to digitally coded information signals.

5. A data converter system in accordance with claim 3 wherein the means for converting the stored digitally coded information signals are constructed to respond to binary coded information signals.

6. In a data converter system wherein binary coded information signals representative of discrete characters are converted to a form suitable for reproduction in a line scan type display at positions determined by their corresponding binary coded addresses said addresses defining a display character sized segment in which the production of the character is to be initiated, apparatus comprising:

means for accepting said binary coded information and addressing signals;

storage means for storing said binary coded information signals containing a storage position corresponding to each of said segments that comprise the display area;

means responsive to said binary coded addresses for causing the binary coded information signals to be stored in said storage means at positions determined by their respective binary coded addresses;

readout means for sequentially reading from said storage means said information signals in synchronism with said line scan display so that as a particular display segment is scanned, the character information for that segment is read from said storage means;

means responsive to said readout means for converting said readout information signals into said second signal in which each of the characters has the form of a plurality of information bits corresponding to unique dot elements in a dot matrix, said dot matrix consisting of a plurality of dot elements on a line for each of a plurality of lines;

and means for coupling said second signal to the line scan display to control said display;

the data converter being so constructed and arranged that the characters are produced on said display at least once each frame as a plurality of dot elements at the positions indicated by said coded addresses.

7. In a data converter system in which binary coded information signals representative of discrete characters are converted to a form suitable for reproduction in a line scan type display at positions determined by corresponding binary coded addresses, said addresses including a coarse address which defines a display character sized segment in which the production of the character is to be initiated and a fine address which defines at what point in said display segment production of the character is to be initiated, apparatus comprising:

means for accepting said binary coded information and addressing signals;

storage means for storing said binary coded information signals containing a storage position corresponding to each of said display segments that comprise the display area;

means responsive to said binary coded addresses for causing said binary coded information signals and their corresponding fine addresses to be stored in said storage means at positions determined by their corresponding coarse addresses;

readout means for reading from said storage means said binary coded information signals and their corresponding fine addresses in synchronism with said line scan display so that as a particular display segment is scanned the character and fine address information for that segment is read from said storage means;

means responsive to said readout means for converting said readout information signals into said second signal in which each of the characters has the form of a plurality of information bits corresponding to unique dot elements in a dot matrix, said dot matrix consisting of a plurality of dot elements on a line for each of a plurality of lines;

means responsive to the fine addresses of the characters for causing said information bits representative of the character to be positioned with respect to the segments within which each character is to be displayed as a function of their corresponding fine addresses;

and means for coupling said second signal to said line scan display to control said display;

the data converted being so constructed and arranged so that the characters are produced on said display at least once each frame as a plurality of dot elements in the segment indicated by the coarse address and within the segment as indicated by the fine address.

8. In a data converter system in which binary coded information signals representative of discrete characters are converted to a form suitable for reproduction in a line scan type display at positions determined by corresponding binary coded addresses, said addresses including a coarse address which defines a display character sized segment in which the production of the character is to be initiated and a fine address which defines at what point in said display segment the production of the character is to be initiated, apparatus comprising:

means for accepting said binary coded information and addressing signals;

storage means for storing said binary coded information signals containing a storage position corresponding to each of said display segments that comprise the display area;

means responsive to said binary coded addresses for causing said binary coded information signals and their corresponding binary coded fine addresses to be stored in said storage means at positions determined by their corresponding coarse addresses;

readout means for reading from said storage means said binary coded information signals and their corresponding fine addresses in synchronism with said line scan display so that as each display line scans through the display segments the symbol and fine address information for the segment in which the line is located, the segment above, the segment to the left, and the segment above and to the left is presented for processing;

means for counting the scan lines so as to determine the position of any scanning line with respect to a segment;

means for selecting the character information to be displayed from the information presented for processing as determined by the scan line count and the vertical coordinate of the fine addresses;

means for correlating the vertical coordinate of the fine address corresponding to the character information selected to be displayed with the fine line count so that the proper dot information for each line of the character is produced for each scan line;

means for converting said selected information signals into said second signal in which each of the characters has the form of a plurality of information bits corresponding to unique dot elements in said line scan display;

means responsive to the fine addresses of the characters for causing said information bits representative of the characters to be positioned with respect to the segment in which it is to be displayed as a function of the corresponding fine address;

and means for coupling said second signal to said line scan display to control said display;

the data converter being so constructed and arranged so that the characters are produced on said display at least once each frame as a plurality of dot elements at the segment indicated by the coarse address and within the segment as determined by the fine address.

9. In a data converter system in which coded information signals representative of discrete characters and their colors are converted to a form suitable for reproduction in a line scan type color display of the type having a plurality of control elements at positions determined by corresponding coded addresses, said system comprising:

means for accepting said coded information and addressing signals;

storage means for storing said coded information signals;

means responsive to said coded addresses for causing the coded information signals to be stored in said storage means at positions determined by their corresponding coded addresses;

readout means for reading from said storage means said coded information signals in synchronism with said display;

means responsive to said readout means for converting said stored coded information signals representative of the characters into said second signal in which each of the characters has the form of a plurality of information bits corresponding to unique dot elements in a line scan display;

means for converting that part of the information signal representative of the colors of the characters into a plurality of signals individually representative of at least one of a plurality of predetermined colors;

a conditioning means responsive to said color representative signals and said second signal representative of the characters for producing an individual second signal representative of the characters for each individual color representative signal;

and means for coupling each individual second signal from said conditioning means to its corresponding control element in the display device;

the data converter being so constructed and arranged so that said characters are presented on said display at least once each frame as a plurality of dot elements at the positions determined by said coded address and in the colors indicated by said coded information signals.

10. A data converter system in accordance with claim 9 wherein the means for converting the stored coded information signals are constructed to respond to binary coded information signals.

11. In a data converter system in which binary coded information signals representative of discrete characters and their corresponding colors are converted to a form suitable for reproduction in a line scan type color display of the type having a plurality of control elements, at positions determined by corresponding binary coded addresses, said addresses defining a display character sized segment in which the production of the character is to be initiated, apparatus comprising:

means for accepting said binary coded information and addressing signals;

storage means for storing said binary coded information signals containing a storage position corresponding to each of said segments that comprise the display area;

means responsive to said binary coded addresses for causing the binary coded information signals to be stored in said storage means at positions determined by their respective binary coded addresses;

readout means for sequentially reading from said storage means said information signals in synchronism with said line scan display so that as a particular display segment is scanned the character information for that segment is read from said storage means;

means for converting said readout information signals representative of the characters into said second signal in which each of the characters is represented by a plurality of information bits corresponding to unique dot elements in a dot matrix said dot matrix consisting of a plurality of dot elements on a line for each of a plurality of lines;

means for converting that part of the information signals representative of the colors of the characters into a plurality of signals individually representative of at least one of a plurality of colors;

a conditioning means so responsive to said individual color representative signals and the second signal representative of the characters that an individual second signal representative of the characters is produced for each individual color representative signal;

and means for coupling said individual second signal representative of the characters to its corresponding control element in the display device;

the data converter being so constructed and arranged so that the characters are produced on said display at least once each frame as a plurality of dot elements at the positions indicated by said binary coded addresses and in the colors indicated by said binary coded information signals.

12. In a data converter system in which binary coded information signals representative of discrete characters and their corresponding colors are converted to a form suitable for reproduction in a line scan type color display of the type having three separate control elements at positions determined by their corresponding binary coded addresses, said addresses including a coarse address which defines a display character sized segment in which production of the symbol is to be initiated and a fine address which defines at what point in said display segment production of the character is to be initiated, apparatus comprising:

means for accepting said binary coded information and addressing signals;

storage means for storing said binary coded information signals containing a storage position corresponding to each of said display segments;

means responsive to said binary coded addresses for causing said binary coded information signals and their corresponding binary coded fine addresses to be stored in said storage means at positions determined by their corresponding coarse addresses;

readout means for reading from said storage means the binary coded information signals and their corresponding fine addresses in synchronism with said line scan display so that as each line scans the display segments the character and fine address information for the segment in which the line scan is presently located, the segment above, the segment to the left and the segment above and to the left is presented for processing;

means for counting the scan lines so as to determine the position of any scanning line within a segment;

means for selecting the character information to be displayed from the information presented for processing for each segment as determined by the scan line count and the vertical coordinate of the fine addresses;

means for correlating the vertical coordinate of fine address corresponding to the character information selected to be displayed with the fine line count so that the proper dot information for each line of the character is produced for each scan line;

means for converting that part of said selected information signals representative of the characters into said second signal in which each of the characters has the form of a plurality of information bits corresponding to unit dot elements in said line scan display;

means responsive to the fine addresses of the characters for causing said information bits to be positioned with respect to the segment in which they are to be displayed as a function of the corresponding fine address;

means for converting that part of said selected information signals representative of the colors of the characters into a plurality of signals individually representative of three colors corresponding to the three control elements of the display device;

a conditioning means so responsive to said individual color representative signals and said second signal representative of the characters that an individual second signal representative of the characters is produced for each color representative signal;

and means for coupling each individual second signal representative of the symbols to the corresponding control elements of the display device;

the data converter being so constructed and arranged so that the characters are produced on said display at least once each frame as a plurality of dot elements at the segment indicated by the coarse address and within the segment as determined by the fine address and in the colors indicated by said binary coded information signals.

13. In a data converter system in which coded information signals representative of discrete characters are converted to a form suitable for reproduction on a display at positions determined by corresponding coded addresses, apparatus comprising:

means for accepting said coded information and addressing signals;

means for dividing said coded addresses into component parts, said component parts including a coarse address which defines a display character sized segment in which the production of the character is to be initiated and a fine address which defines at what point in said display segment production of the character is to be initiated, the combination of the coarse and fine address completely defining the character address;

storage means for storing said coded information signals containing a storage position corresponding to each of said display segments that comprise the display area;

means responsive to said coded addresses for causing said coded information signals and their corresponding fine addresses to be stored in said storage means at positions determined by their corresponding coarse addresses;

readout means for individually reading from said storage means said coded information signals and their corresponding fine addresses;

first means for developing coarse address signals representative of the storage position from which the coded information signals representative of discrete characters and their corresponding fine addresses are read;

means for converting the coded information signals representative of the characters to a form suitable for reproduction on the display surface;

and means for coupling the converted character information, the coarse address information developed by said first means and the fine address read from such storage means to the display device so that the characters are produced on the display at the positions determined by their coded addresses.

References Cited

UNITED STATES PATENTS

| | | | |
|---|---|---|---|
| 3,069,681 | 12/1962 | Sloan | 340—324.1 |
| 3,090,041 | 5/1963 | Dell | 340—324.1 |
| 3,130,397 | 4/1964 | Simmons | 340—324.1 |
| 3,158,858 | 11/1964 | Ragen et al. | 340—324.1 |
| 3,241,120 | 3/1966 | Amdahl | 340—324.1 |
| 3,256,516 | 6/1966 | Melia | 340—324.1 |
| 3,292,154 | 12/1966 | Simmons | 340—324.1 |
| 3,293,614 | 12/1966 | Fenimore | 340—324.1 |

NEIL C. READ, *Primary Examiner.*

A. J. KASPER, *Assistant Examiner.*